US012746901B2

(12) United States Patent
Asano et al.

(10) Patent No.: US 12,746,901 B2
(45) Date of Patent: Sep. 29, 2026

(54) BRAKE CONTROL DEVICE AND BRAKE CONTROL METHOD

(71) Applicants: TOYOTA JIDOSHA KABUSHIKI KAISHA, Toyota (JP); ADVICS CO., LTD., Kariya-shi (JP); J-QuAD DYNAMICS Inc., Tokyo (JP)

(72) Inventors: Tomotaka Asano, Nisshin (JP); Yosuke Hashimoto, Tokyo (JP)

(73) Assignees: TOYOTA JIDOSHA KABUSHIKI KAISHA, Toyota (JP); ADVICS CO., LTD., Kariya (JP); J-Quad Dynamics Inc., Tokyo (JP)

( * ) Notice: Subject to any disclaimer, the term of this patent is extended or adjusted under 35 U.S.C. 154(b) by 60 days.

(21) Appl. No.: 19/032,552

(22) Filed: Jan. 21, 2025

(65) Prior Publication Data

US 2025/0256690 A1 Aug. 14, 2025

(30) Foreign Application Priority Data

Feb. 9, 2024 (JP) ................................. 2024-018733

(51) Int. Cl.
*B60T 8/1755* (2006.01)

(52) U.S. Cl.
CPC ....... *B60T 8/17551* (2013.01); *B60T 2201/16* (2013.01)

(58) Field of Classification Search
CPC . B60T 8/17551; B60T 8/1755; B60T 2201/16
See application file for complete search history.

(56) References Cited

U.S. PATENT DOCUMENTS

| | | | | |
|---|---|---|---|---|
| 5,040,115 A * | 8/1991 | Fukushima | B60G 17/0195 701/70 |
| 5,934,769 A * | 8/1999 | Brachert | B60T 8/1764 303/146 |
| 12,358,505 B2 * | 7/2025 | Okubo | B62D 6/10 |
| 2015/0246675 A1 * | 9/2015 | Matsunaga | B60W 10/184 701/1 |

(Continued)

FOREIGN PATENT DOCUMENTS

| | | |
|---|---|---|
| JP | 2013-028201 A | 2/2013 |
| JP | 2022-021715 A | 2/2022 |
| WO | 2013/014516 A1 | 1/2013 |

*Primary Examiner* — George C Jin
(74) *Attorney, Agent, or Firm* — Dinsmore & Shohl LLP

(57) ABSTRACT

A brake control device includes: an acquisition section that acquires a steering angle and a first steering angular velocity passed through a first low-pass filter; a braking processing section that decides to apply braking force to a wheel by a brake device when the absolute value of steering angle is not less than a predetermined angle and the absolute value of first steering angular velocity is not less than a predetermined velocity; and a control section that drives the brake device according to the braking processing section's decision. The acquisition section acquires a second steering angular velocity including higher frequency components than the first steering angular velocity, the braking processing section decides to execute predetermined preload control when the absolute value of second steering angular velocity is not less than the predetermined velocity, and the control section executes preload control on the brake device to improve the brake device's responsiveness.

5 Claims, 3 Drawing Sheets

(56) References Cited

U.S. PATENT DOCUMENTS

| | | | | |
|---|---|---|---|---|
| 2016/0059852 | A1* | 3/2016 | Yamakado | B60W 30/09 701/41 |
| 2022/0024464 | A1 | 1/2022 | Katsuyama | |
| 2022/0227338 | A1* | 7/2022 | Patheja | B60W 10/18 |
| 2023/0016560 | A1* | 1/2023 | Kitazume | B62D 5/0472 |

* cited by examiner

BRAKE CONTROL DEVICE AND BRAKE CONTROL METHOD

CROSS-REFERENCE TO RELATED APPLICATION

This application claims priority to Japanese Patent Application No. 2024-018733 filed on Feb. 9, 2024, incorporated herein by reference in its entirety.

BACKGROUND

1. Technical Field

The disclosure relates to a brake control that applies braking force to a wheel based on steering angle information about steering performed by a driver.

2. Description of Related Art

Japanese Unexamined Patent Application Publication No. 2013-28201 discloses a device that performs a vehicle behavior stabilization control to stabilize the behavior of a vehicle by generating a braking control amount at one of the front and rear outer turning wheels. When switchback steering in the opposite direction to the current vehicle turning operation is detected while the vehicle behavior stabilization control is being executed, the vehicle behavior stabilization control device applies preliminary brake pressure to one of the front and rear inner turning wheels.

SUMMARY

According to the technology disclosed in JP 2013-28201 A, although the brake control is executed during switchback steering, the brake control is not executed in situations other than switchback steering. For example, it is simply desirable that driving assistance be provided responsively by the brake control when the steering wheel is abruptly turned.

The purpose of the disclosure is to provide a technology to improve the responsiveness of brake control that provides driving assistance based on steering information.

In order to solve the problem, a brake control device in an aspect of the disclosure includes: an acquisition section that acquires a steering angle and a first steering angular velocity passed through a first low-pass filter; a braking processing section that decides to apply braking force to a wheel by a brake device when the absolute value of the steering angle is greater than or equal to a predetermined angle and the absolute value of the first steering angular velocity is greater than or equal to a predetermined velocity; and a control section that drives the brake device according to the decision of the braking processing section. The acquisition section acquires a second steering angular velocity including higher frequency components than the first steering angular velocity. The braking processing section decides to execute a predetermined preload control when the absolute value of the second steering angular velocity is greater than or equal to a predetermined velocity. The control section executes the preload control on the brake device to improve the responsiveness of the brake device.

Another aspect of the disclosure is a brake control method. This method is a brake control method including steps to be executed by a brake control device, the steps including: acquiring a steering angle and a first steering angular velocity passed through a first low-pass filter; acquiring a second steering angular velocity including higher frequency components than the first steering angular velocity; deciding to execute a preload control for improving responsiveness of a brake device when the absolute value of the second steering angular velocity is greater than or equal to a predetermined velocity; and deciding to apply braking force to a wheel by the brake device when the absolute value of the steering angle is greater than or equal to a predetermined angle and the absolute value of the first steering angular velocity is greater than or equal to a predetermined velocity.

According to the disclosure, it is possible to provide a technology to improve the responsiveness of brake control that provides driving assistance based on steering information.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
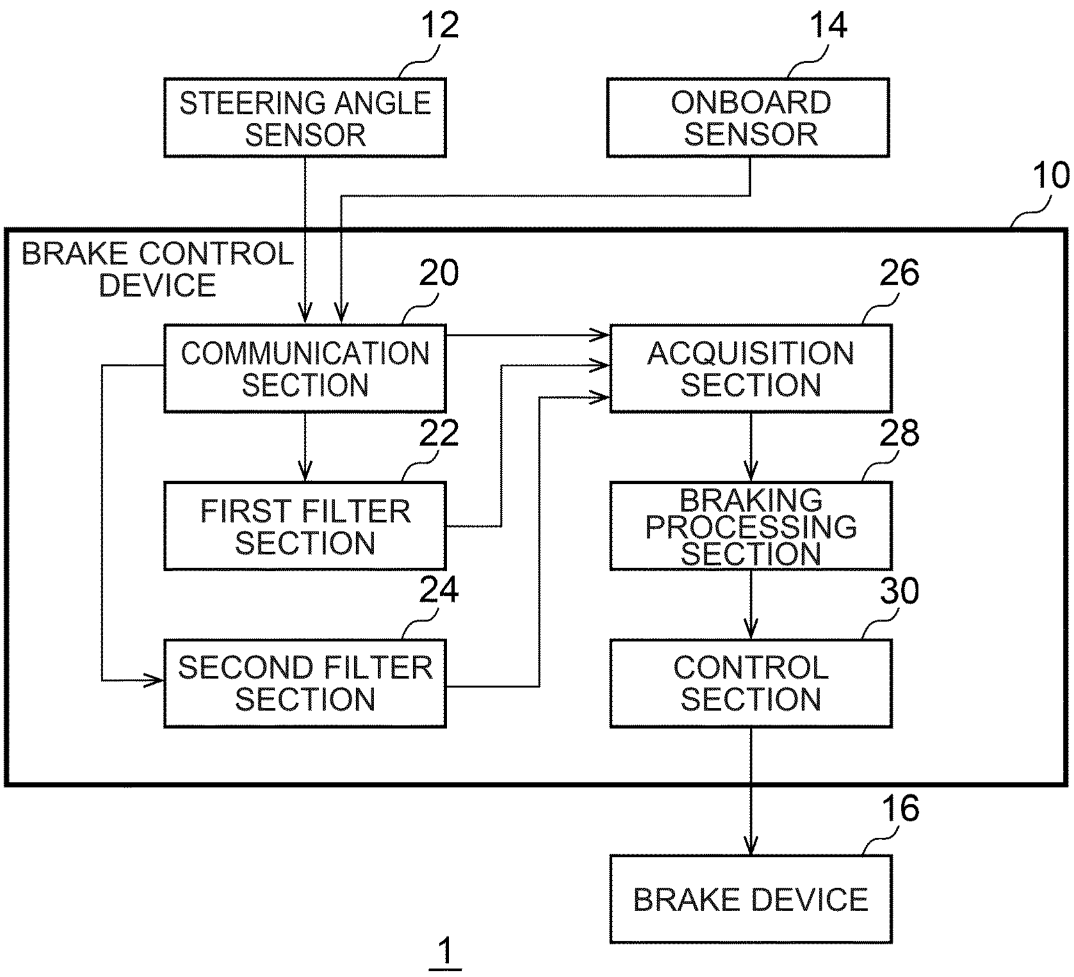
FIG. 1 is a diagram showing a functional configuration of a brake system.

FIG. 1 is a diagram showing the functional configuration of a brake system 1. Functions of the brake system 1 can be configured by a circuit block, memory, and other LSI in terms of hardware, and are realized, in terms of software, by system software and application programs loaded in the memory. Therefore, it should be understood by those skilled in the art that the functions of the brake system 1 can be realized in various ways, including but not limited to, using only hardware, only software, or a combination thereof. The brake system 1 is mounted on a vehicle, and the vehicle may be capable of driving autonomously.

The brake system 1 includes a brake control device 10, a steering angle sensor 12, an onboard sensor 14, and a brake device 16. The brake system 1 automatically provides braking force based on the detection result of the steering angle sensor 12, and executes assistance to stabilize traveling of the vehicle.

The steering angle sensor 12 detects the rotation angle of a steering wheel, and detects a driver's steering angle. The steering angle sensor 12 transmits the detection results to the brake control device 10. The onboard sensor 14 is, for example, a wheel speed sensor and a brake pressure sensor, and transmits the detection results to the brake control device 10. The wheel speed sensor detects the rotation speed of a wheel. The brake pressure sensor detects a brake pressure applied by the brake device 16. The brake pressure sensor is mounted to a master cylinder and a wheel cylinder.

The brake device 16 is a hydraulic brake device that applies frictional force to the wheel, and is driven under the control of the brake control device 10 to apply braking force to the vehicle. The brake device 16 has the master cylinder connected to a brake pedal, the wheel cylinder that moves a piston linked to a brake pad, etc.

The brake control device 10 includes a communication section 20, a first filter section 22, a second filter section 24, an acquisition section 26, a braking processing section 28, and a control section 30. The communication section 20 has an onboard communication function, and receives detection results from the steering angle sensor 12 and the onboard sensor 14.

The first filter section 22 is a software application having a first low-pass filter function, and the second filter section 24 is a software application having a second low-pass filter function. The first filter section 22 and the second filter section 24 send, to the acquisition section 26, steering angle information obtained by removing high frequency components from a sensor value received from the steering angle sensor 12.

The first filter section 22 removes high frequency components from a steering angle and a steering angular velocity transmitted from the steering angle sensor 12. The first filter section 22 obtains a first steering angular velocity by removing high frequency components greater than or equal to a first threshold from the steering angular velocity which has been received from the steering angle sensor 12 and for which noise removal processing has not been performed.

The second filter section 24 obtains a second steering angular velocity by removing high frequency components greater than or equal to a second threshold from the steering angular velocity transmitted from the steering angle sensor 12. The second threshold may be set to a cutoff frequency greater than or equal to several times the first threshold. Since the second threshold is set to be greater than the first threshold, the second steering angular velocity includes higher frequency components than the first steering angular velocity. The second steering angular velocity may be a sensor value that has not passed through the low-pass filter, and it is possible to implement minimal noise removal using the second filter section 24.

The acquisition section 26 acquires the steering angle and the first steering angular velocity passed through a first low-pass filter, and acquires the second steering angular velocity passed through a second low-pass filter. Moreover, the acquisition section 26 acquires the wheel speed and the brake pressure as the detection results of the onboard sensor 14.

When the absolute value of the steering angle is greater than or equal to a predetermined angle and the absolute value of the first steering angular velocity is greater than or equal to a predetermined velocity, the braking processing section 28 determines to apply braking force to the wheel by the brake device 16. The braking processing section 28 decides a braking amount for each wheel according to a preset control map. In this control map, the braking force distribution to each wheel in the main pressurization control is defined, and the distribution to the left and right front wheels and the left and right rear wheels is also defined. The control section 30 operates the brake device 16 according to the decision of the braking processing section 28. The control for applying braking force based on the steering angle and the first steering angular velocity is referred to as the main pressurization control. Therefore, when the steering wheel is abruptly turned, the brake control device 10 can operate the brake device 16 to stabilize the traveling.

When the absolute value of the second steering angular velocity is greater than or equal to a predetermined velocity, the braking processing section 28 decides to execute a predetermined preload control. The braking processing section 28 sends the decision result to the control section 30. The predetermined preload control is a control for improving the responsiveness of the brake device 16. The main pressurization control applies the pressure while monitoring not only the first steering angular velocity but also the steering angle, and therefore abrupt turning of the steering wheel can be accurately determined. On the other hand, since the preload control is executed based only on the second steering angular velocity, the control is highly responsive. Furthermore, since the second steering angular velocity includes large amounts of higher frequency components than the first steering angular velocity, the second steering angular velocity can be more quickly detected relative to the first steering angular velocity.

The predetermined velocity used for the first steering angular velocity in determining whether to execute the main pressurization control and the predetermined velocity used for the second steering angular velocity in determining whether to execute the preload control have the same value. Therefore, it can be determined earlier that the second steering angular velocity becomes equal to or greater than the predetermined velocity than that the first steering angular velocity is equal to or greater than the predetermined velocity.

The control section 30 executes the preload control on the brake device 16 in response to the decision results from the braking processing section 28. As the preload control, the control section 30 drives the brake device 16 to apply a predetermined preliminary brake pressure, and/or reduces an idle stroke of the master cylinder of the brake device 16.

In the preload control, since the control section 30 drives the brake device 16 to apply the predetermined preliminary brake pressure, each wheel cylinder of the brake device 16 is actually in a pressurized state, and, consequently, the responsiveness of the brake device 16 is improved. The preliminary brake pressure is determined by experiments or the like, is set to a very small value that causes almost no change in the wheel speed and does not cause the occupant to feel deceleration, and is smaller than the brake pressure applied by the main pressurization control. The preliminary brake pressure is distributed to the front and rear wheels at a preset ratio.

In the preload control, the control section 30 reduces the idle stroke of the master cylinder of the brake device 16, and, consequently, the idle stroke is eliminated, and the responsiveness of the brake device 16 is improved. In order to reduce the idle stroke of the master cylinder of the brake device 16, the control section 30 moves the piston of the master cylinder to the pressurizing side.

Figures 2A, 2B, 2C, 2D:
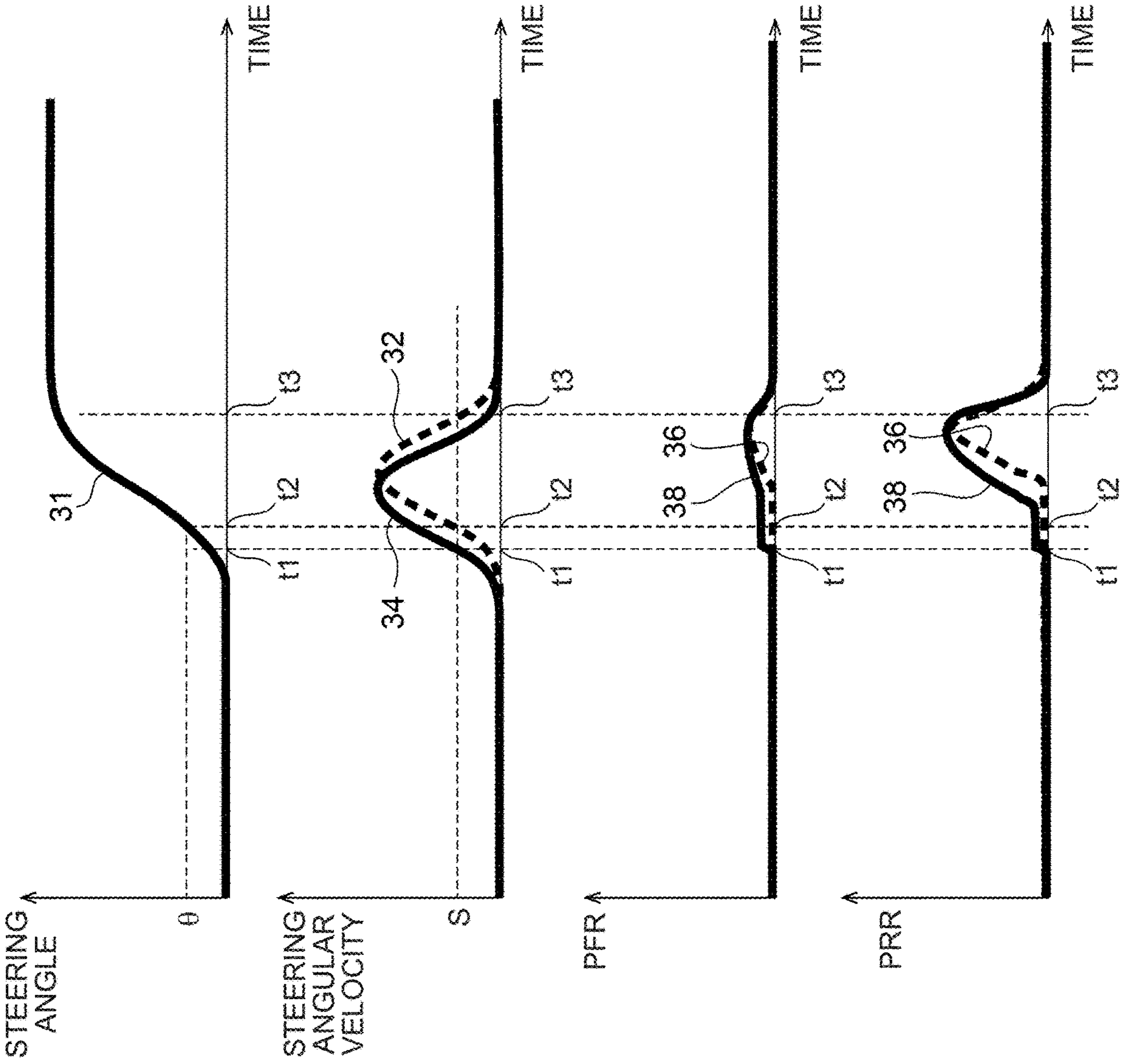
FIG. 2A is a view for explaining the operation of a brake control device to execute a preload control and a main pressurization control based on steering angle information.
FIG. 2B is a view for explaining the operation of the brake control device to execute the preload control and the main pressurization control based on the steering angle information.
FIG. 2C is a view for explaining the operation of the brake control device to execute the preload control and the main pressurization control based on the steering angle information.
FIG. 2D is a view for explaining the operation of the brake control device to execute the preload control and the main pressurization control based on the steering angle information.

FIG. 2A, FIG. 2B, FIG. 2C and FIG. 2D are views for explaining the operation of the brake control device 10 to execute the preload control and the main pressurization control based on the steering angle information. The horizontal axis of the graphs shown in FIG. 2A to FIG. 2D represents time, and all of times t1, t2, and t3 are the same. The vertical axis of FIG. 2A represents the steering angle, the vertical axis of FIG. 2B represents the steering angular velocity, the vertical axis of FIG. 2C represents PFR (actual hydraulic pressure in the wheel cylinder of the right front wheel), and the vertical axis of FIG. 2D represents PRL (actual hydraulic pressure in the wheel cylinder of the left rear wheel).

As shown in FIG. 2A, a steering angle 31 suddenly rises and becomes substantially constant at time t3. In other words, the driver abruptly turns the steering wheel to make the vehicle turn. The steering angle 31 shown in FIG. 2A is the steering angle after passing through the first low-pass filter.

In FIG. 2B, a first steering angular velocity 32 and a second steering angular velocity 34 are shown. The second steering angular velocity 34 rises faster than the first steering angular velocity 32. At time t1, the second steering angular velocity 34 reaches or exceeds a predetermined velocity S, and the preload control is executed. At time t2, the first steering angular velocity 32 reaches or exceeds the predetermined velocity S, and the steering angle becomes equal to or greater than a predetermined angle θ, and, therefore, the main pressurization control is executed. Thus, the preload control is started at an earlier timing than the main pressurization control.

In FIG. 2C and FIG. 2D, a first brake assistance result 36 when the preload control was not executed, and a second brake assistance result 38 when the preload control was performed are shown. In the first brake assistance result 36, whether to start control is determined based on the steering angle 31 and the first steering angular velocity 32, and, in the second brake assistance result 38, whether to start control is determined based on the second steering angular velocity 34.

In the first brake assistance result 36 shown in FIG. 2C and FIG. 2D, the main pressurization control is executed from time t2, and the PFR and PRL rise a little later. At time t3, the main pressurization control is terminated, and the PFR and PRL decrease.

In the second brake assistance result 38 shown in FIG. 2C and FIG. 2D, the preload control is started from time t1, and the PFR and PRL rise only a little and are maintained at a constant pressure. In the preload control, the control section 30 drives the brake device 16 to apply a predetermined preliminary brake pressure. In the preload control, the same preliminary brake pressure may be applied to the wheel cylinders of the front and rear wheels.

Although the main pressurization control is started from time t2, the PFR and PRL rise shortly after time t2. The main pressurization control is terminated at time t3, and the PFR and PRL decrease. Thus, when the driver abruptly turns the steering wheel, the brake control device 10 can automatically apply brake force to stabilize the traveling. Moreover, compared to the first brake assistance result 36 without the preload control, the PFR and PRL in the second brake assistance result 38 quickly rise from time t2 at which the main pressurization control is started. This makes it easier to stabilize the traveling of the vehicle.

Let's return to FIG. 1. The braking processing section 28 decides to terminate the preload control when a predetermined termination condition is satisfied before the main pressurization control is started after the start of the preload control. Then, when the main pressurization control is started, the preload control is terminated.

The braking processing section 28 decides to terminate the preload control when the time from the start of the preload control exceeds a predetermined time. Therefore, if the main pressurization control is not started at all after the preload control is started, the preload control can be terminated. The predetermined time is set to several seconds or less.

The braking processing section 28 terminates the preload control when the absolute value of the second steering angular velocity is less than or equal to a predetermined termination velocity that is less than the predetermined velocity. The predetermined termination velocity is determined by experiments or the like, and set to a value slightly less than the predetermined velocity, thereby making it possible to prevent the preload control from being frequently turned on and off.

According to the decision result of the braking processing section 28, when the time from the start of the preload control exceeds the predetermined time, the control section 30 terminates the preload control, or, when the absolute value of the second steering angular velocity is less than or equal to the predetermined termination velocity that is less than the predetermined velocity, the control section 30 terminates the preload control.

Figure 3:
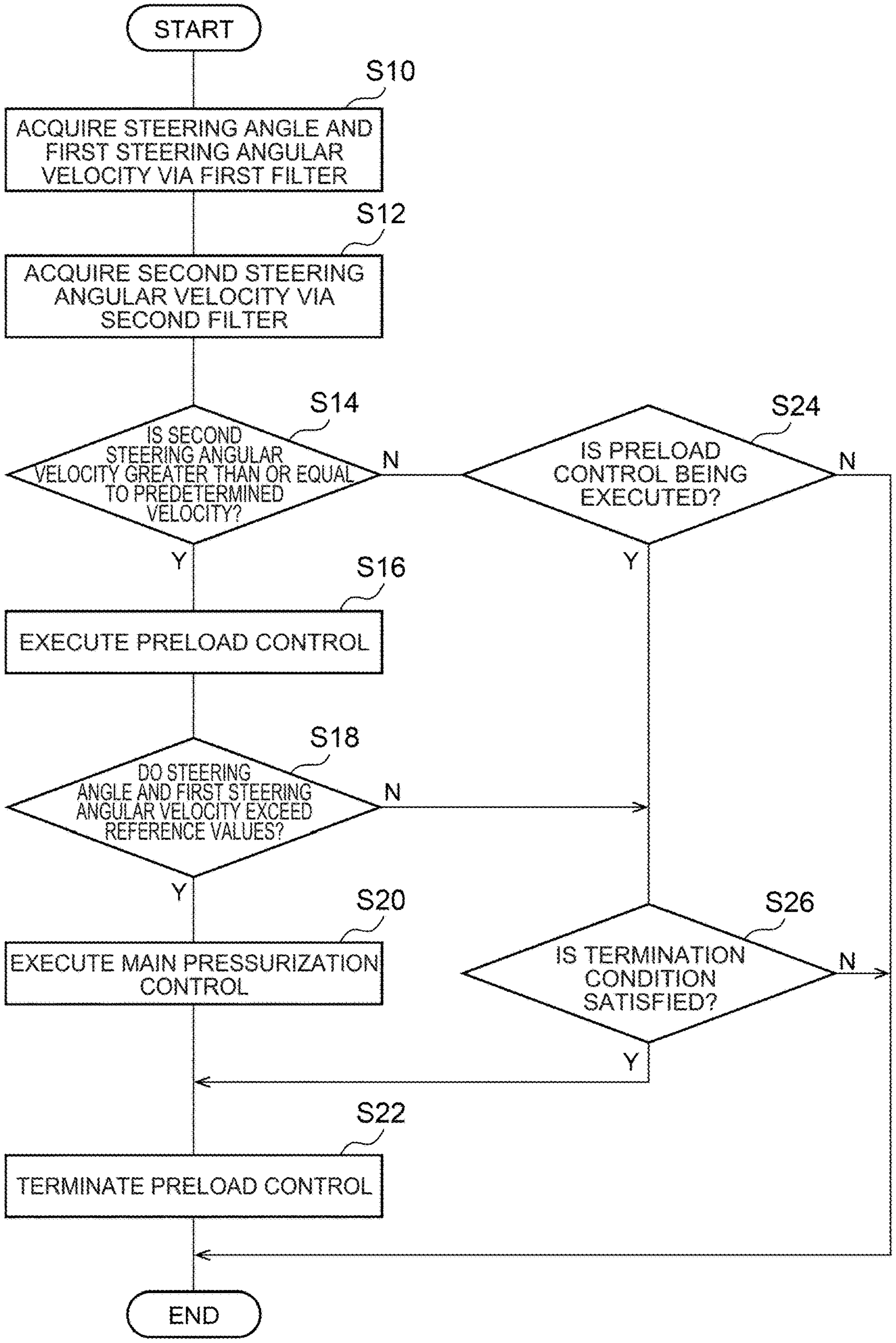
FIG. 3 is a flowchart of a brake control method of an embodiment.

FIG. 3 is a flowchart of a brake control method of an embodiment. The first filter section 22 allows the detection result from the steering angle sensor 12 to pass through the first low-pass filter, and the acquisition section 26 acquires the steering angle and the first steering angular velocity (S10).

The second filter section 24 allows the detection result from the steering angle sensor 12 to pass through the second low-pass filter, and the acquisition section 26 acquires the second steering angular velocity (S12). The braking processing section 28 determines whether the second steering angular velocity is greater than or equal to a predetermined velocity (S14). When the second steering angular velocity is greater than or equal to the predetermined velocity S (Y in S14), the braking processing section 28 decides to execute the preload control, and the control section 30 executes the preload control (S16). Consequently, the responsiveness of the brake device 16 is improved.

After the preload control is executed, the braking processing section 28 determines whether the steering angle and the first steering angular velocity exceed reference values (S18). When the steering angle is greater than or equal to a predetermined angle θ and the first steering angular velocity is greater than or equal to the predetermined velocity S (Y in S18), the braking processing section 28 decides to execute the main pressurization control, and the control section 30 executes the main pressurization control (S20). When the main pressurization control is executed, the control section 30 terminates the preload control (S22).

When the second steering angular velocity is not greater than or equal to the predetermined velocity S (N in S14), the braking processing section 28 determines whether the preload control is being executed (S24). When the preload control is not being executed (N in S24), the braking processing section 28 terminates the process without applying pressure to the brake.

When the preload control is being executed (Y in S24), the braking processing section 28 determines whether a preload control termination condition is satisfied. Moreover, when the steering angle is not greater than or equal to the predetermined angle θ, or when the first steering angular velocity is not greater than or equal to the predetermined velocity S (N in S18), the braking processing section 28 determines whether the preload control termination condition is satisfied (S26).

The preload control termination condition is satisfied when the time from the start of the preload control exceeds the predetermined time, or when the absolute value of the second steering angular velocity is less than or equal to the predetermined termination velocity that is less than the predetermined velocity. When the preload control termination condition is satisfied (Y in S26), the control section 30 terminates the preload control (S22). When the preload control termination condition is not satisfied (N in S26), the control section 30 terminates the process while continuing the preload control.

The present disclosure has been described above based on the embodiments. The present disclosure is not limited to the embodiments, and various modifications such as design changes can be made based on the knowledge of those skilled in the art.

What is claimed is:

1. A brake control device comprising:

an acquisition section that acquires a steering angle and a first steering angular velocity passed through a first low-pass filter;

a braking processing section that decides to apply braking force to a wheel by a brake device when an absolute value of the steering angle is greater than or equal to a predetermined angle and an absolute value of the first steering angular velocity is greater than or equal to a predetermined velocity; and a control section that drives the brake device according to the decision of the braking processing section, wherein, the acquisition section acquires a second steering angular velocity including higher frequency components than the first steering angular velocity, the braking processing section decides to execute a predetermined preload control when an absolute value of the second steering angular velocity is greater than or equal to a predetermined velocity, and the control section executes the preload control on the brake device to improve responsiveness of the brake device.

2. The brake control device according to claim 1, wherein the control section drives the brake device to apply a predetermined preliminary brake pressure, or reduces an idle stroke of a master cylinder of the brake device, as the preload control.

3. The brake control device according to claim 1, wherein the second steering angular velocity is a value obtained through a second low-pass filter having a second threshold greater than a first threshold of the first low-pass filter.

4. The brake control device according to claim 1, wherein the control section terminates the preload control when a time from a start of the preload control exceeds a predetermined time, or when the absolute value of the second steering angular velocity is less than or equal to a predetermined termination velocity that is less than the predetermined velocity.

5. A brake control method comprising steps to be executed by a brake control device, the steps including:

acquiring a steering angle and a first steering angular velocity passed through a first low-pass filter;

acquiring a second steering angular velocity including higher frequency components than the first steering angular velocity;

deciding to execute a preload control for improving responsiveness of a brake device when an absolute value of the second steering angular velocity is greater than or equal to a predetermined velocity; and deciding to apply braking force to a wheel by the brake device when an absolute value of the steering angle is greater than or equal to a predetermined angle and an absolute value of the first steering angular velocity is greater than or equal to a predetermined velocity.

* * * * *